(No Model.)
J. H. MILLER.
PITMAN BEARING.
No. 490,296. Patented Jan. 24, 1893.
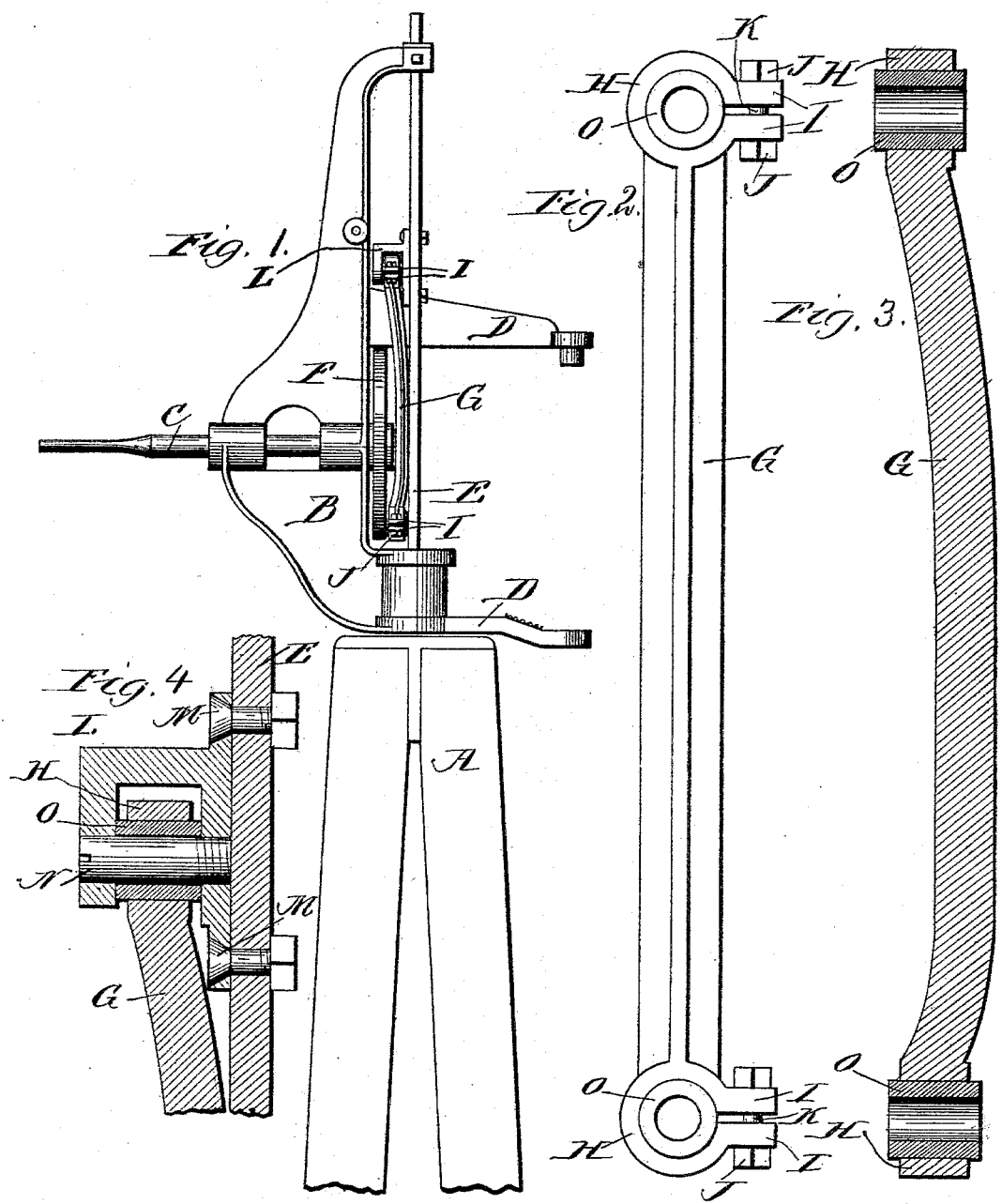
Witnesses.
W. C. Corlies
Fredk. H. Miles.
Inventor
John H. Miller
By Coburn & Thacher
Attys.

UNITED STATES PATENT OFFICE.

JOHN H. MILLER, OF BATAVIA, ILLINOIS, ASSIGNOR TO THE UNITED STATES WIND ENGINE AND PUMP COMPANY, OF SAME PLACE.

PITMAN-BEARING.

SPECIFICATION forming part of Letters Patent No. 490,296, dated January 24, 1893.

Application filed April 6, 1892. Serial No. 428,083. (No model.)

*To all whom it may concern:*

Be it known that I, JOHN H. MILLER, a citizen of the United States, residing at Batavia, in the county of Kane and State of Illinois, have invented a certain new and useful Improvement in Pitman-Bearings for Windmills, which is fully set forth in the following specification, reference being had to the accompanying drawings, in which—

Figure 1, represents a side elevation of my invention, applied to a wind mill. Fig. 2, a side elevation of the pitman, detached. Fig. 3, a longitudinal, sectional view of the pitman, taken at the line 3—3, Fig. 2; and, Fig. 4, is a sectional view, showing the attachment of the pitman to the pump-rod.

The invention described and shown in this application, is shown in my application Serial No. 406,600, but not there claimed.

I find that it is very desirable in wind mills that the bearings of the pitman connecting the pump-rod to the crank-wheel of the wind mill, be close-fitting bearings, so that there will be no pounding or sudden jerking in conveying the power from the crank-wheel to the pump-rod. Inasmuch as a wind mill is in almost constant use, and is expected to last a long time, the bearings of the pitman are subject to wear, and if they are tolerably close-fitting at first, become loose after a time, and are liable to rattle and become so loose as to cause a thumping and jarring in converting the rotary into a reciprocating motion, that is injurious to the wind mill.

My invention consists in the special construction of the wind mill pitman hereinafter described, and the combination of the same with the various co-operating parts.

In the accompanying drawings, A represents the top of the tower of the wind mill. B, the wind mill casting, which rests on the top of the tower, and is provided with bearings for the wind wheel shaft C, and the brackets D—D to which the vane of the wind mill is attached.

E, is the pump-rod. F, the crank-wheel, rigidly secured to the wind wheel shaft C.

G, is a pitman with a bearing at each end. These bearings are provided with flanges or lugs, I, through which bolts K pass, which carry the nuts J. These nuts and bolts are used for the purpose of tightening the bearing to take up any wear that may occur.

O, are graphite thimbles, which I insert in the bearings H. These thimbles surround the journals of these bearings in the form of sleeves when the mill is new, but when they become loose, either in the bearing or on the journal-pin, I remove the bolts K, and cut a slit (preferably using a saw for that purpose) which enables me to reduce the diameter of the graphite thimbles as I reduce the size of the bearings H to tighten it to compensate for any wear in the joints.

L, is a flanged box, rigidly and firmly secured to the pump-rod E, by means of the bolts M. The end of the pitman G is secured to this box M, by means of the journal-pin N. I have shown the journal-pin N screw-threaded to hold it in place; but I may use an ordinary bolt, secured with a pin, or other suitable means. I also secure the pitman to the wrist-pin of the crank-wheel F in any of the well-known ways. I make my pitman G of metal, with a central strengthening rib, as clearly shown in Fig. 2, for the purpose of making it light, and at the same time giving it strength. My pitman has an open bearing at each end, the opening being on the side of the bearing, out of the line of the thrust of the pitman. The flanges or lugs I are on the side of the bearing and can be reached in the box L. This construction of the bearing with the openings on their sides not only takes the openings out of line of the thrust of the pitman and away from the main wear of the bearing, but enables me to make my pitman no longer than a pitman with closed bearings.

I find that my wind mill pitman is very effective and durable; that it requires little, or no, attention, and the bearings will keep close-fitting for a long time, and when they become worn, they can be readily tightened and fitted in the manner above described, without any expense.

Having fully described the construction and operation of my invention, what I claim as new and desire to secure by Letters Patent, is:

In a wind mill, the pitman G having open bearings H at each end provided with lugs or flanges I on the sides of the bearings, making the openings to the bearings and the lugs or flanges out of line of the thrust of the pitman; bolts passing through the lugs or flanges of the bearings to tighten the bearing; and graphite thimbles O fitting the bearings, which can be cut and adjusted with the bearings to take up the wear, substantially as specified.

JOHN H. MILLER.

Witnesses:
 ALOYSIA HELMICH,
 H. D. HOLLISTER.